April 6, 1965 NORIYOSHI KUROYANAGI 3,177,371

DIGITAL LOGIC CIRCUIT UTILIZING TRANSFORMERS

Filed May 19, 1960 7 Sheets-Sheet 1

INVENTOR.
NORIYOSHI KUROYANAGI,
BY
Ward, Neal, Haselton, Orme & McElhannon
ATTORNEYS.

April 6, 1965 NORIYOSHI KUROYANAGI 3,177,371

DIGITAL LOGIC CIRCUIT UTILIZING TRANSFORMERS

Filed May 19, 1960 7 Sheets-Sheet 2

INVENTOR.
NORIYOSHI KUROYANAGI.
BY
Ward, Neal, Haselton, Orme & McElhannon
ATTORNEYS.

DIGITAL LOGIC CIRCUIT UTILIZING TRANSFORMERS

Filed May 19, 1960 7 Sheets-Sheet 3

INVENTOR.

NORIYOSHI KUROYANAGI.

BY

Ward, Neal, Haselton, Orme & McElhannon

ATTORNEYS.

INVENTOR.
NORIYOSHI KUROYANAGI.
BY
Ward, Neal, Haselton, Orme & McElhannon
ATTORNEYS.

April 6, 1965 NORIYOSHI KUROYANAGI 3,177,371

DIGITAL LOGIC CIRCUIT UTILIZING TRANSFORMERS

Filed May 19, 1960 7 Sheets-Sheet 5

INVENTOR

NORIYOSHI KUROYANAGI.

BY

Ward, Neal, Haselton, Orme & McElhannon

ATTORNEYS

April 6, 1965 NORIYOSHI KUROYANAGI 3,177,371

DIGITAL LOGIC CIRCUIT UTILIZING TRANSFORMERS

Filed May 19, 1960 7 Sheets-Sheet 6

INVENTOR.

NORIYOSHI KUROYANAGI.

BY

Ward, Neal, Haselton, Orme & McElhannon

ATTORNEYS.

DIGITAL LOGIC CIRCUIT UTILIZING TRANSFORMERS

Filed May 19, 1960 7 Sheets-Sheet 7

INVENTOR.
NORIYOSHI KUROYANAGI.
BY
Ward, Neal, Haselton, Orme & McElhannon
ATTORNEYS.

United States Patent Office 3,177,371

Patented Apr. 6, 1965

3,177,371

DIGITAL LOGIC CIRCUIT UTILIZING TRANSFORMERS

Noriyoshi Kuroyanagi, Mitaka-shi, Japan, assignor to Nippon Telegraph & Telephone Public Corporation, Tokyo, Japan, a corporation of Japan Filed May 19, 1960, Ser. No. 30,103

Claims priority, application Japan, May 25, 1959, 34/16,332; Mar. 10, 1960, 35/7,706, 35/7,407, 35/7,408; Mar. 16, 1960, 35/8,282

7 Claims. (Cl. 307—88.5)

The invention relates to a logical circuit. In high speed digital electric computers in larger scale, it is necessary to transmit whole numeral information stored in each of the resistors as one word of the number in an arithmetic unit as an information group consisting of one unit of a word to one of the other resistor groups or circuits. If an ordinary logical circuit of diodes is employed as selective transmission lines for this purpose, the number of elements increases considerably, and, its power efficiency being poor, it necessitates a long chain of stages of logical operation regeneration amplification. Therefore, it has a disadvantage of taking much time for this sort of selective transmission.

Though a logical operation of "NOT" is a necessary function for various kinds of control of an arithmetic circuit, its power efficiency, when equipped with ordinary diode logical circuits, is not a satisfactory one and it makes a logical layout somewhat difficult. Generally, the floating point system in the arithmetic calculation is superior to the fixed point system which has to be stopped every time when the overflows come out. The former can treat the numbers in larger scale than the latter. But, in the floating point system, if an ordinary logical circuit is employed for it, it takes more time for the operation than with a fixed point device, and it takes even ten times the time of operation of the fixed point calculation system.

For the floating point system calculation, the number has to be analyzed in number part and index part, by which the binary point is assigned. In making an addition or subtraction of two numbers, these indexes are compared against each other at first, then the number part, the digit number of their difference in absolute value is shifted, both number parts are added or subtracted, and the sum obtained by addition or subtraction is again shifted to get an exact binary point, so that the right index part can be obtained. In the arithmetic units hitherto known, the shifting is performed by the repetition of each bit one by one, checking the shifted times against the shifting counter. It takes therefore the operation time of one step for the shifting of each bit of the digit and a long time is required for operation, when the number of digits to be shifted increases.

The present invention aims to remove such substantial defects which the usual logical circuit and logical system have, and it offers a new circuit with some improvement in the selective transmission line, a logical "NOT" circuit and a high speed shifting circuit. It provides the operation with high speed and efficiency and shows a remarkable progress in the logical circuit network of computers. The variations of the circuits after the invention are based on the same simple principle and have an extensive field of applications. The present invention, removing the defects of logical circuits known hitherto, has the features that in the logical circuit the current induced by both inputs at proper terminals of the circuit, flows into a branch line of the circuit as an output current in the load impedance inserted into a part of said branch line, connecting the gate elements, the conduction of which is controlled by the input, and the voltage feeder that has the inducing voltage is controlled by one of the inputs.

In the following the invention will be explained in detail referring to the drawings, wherein.

Figure 1:
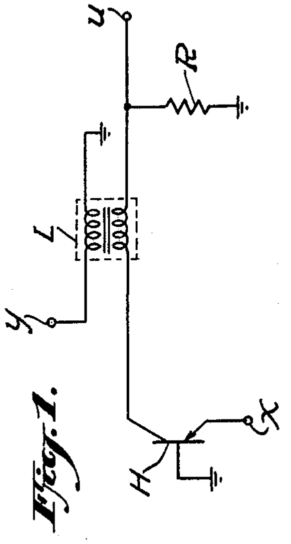
FIG. 1 shows a basic circuit according to the idea of the invention.

Referring to FIG. 1, the reference letter or symbol H designates a transistor, L, a conventional, polarity insensitive pulse transformer, R, a load resistor, $x$ and $y$, the input terminals to be driven by the signal inputs corresponding to the input logical values $x$ and $y$ respectively, and $u$, the output terminal which similarly corresponds to the logical value U.

The symbols in the figures of the drawings are so employed that the part or parts having the same function are denoted by the same symbols, but sometimes suffixes are attached in order to avoid confusion when there are a plurality of the same parts which have to be distinguished from one another in a figure. $v$ is used as the symbol to show an indefinite number but not including 0.

The input in FIG. 1 is applied to terminal $x$ and the emitter current flows into the transistor H which is in a conductive state only for the length of time the input pulse exists. When a voltage is not applied to the collector, collector current is not produced, but if a negative voltage, which is induced through the transformer L when input is applied to $y$, is supplied to the collector, the collector current flows.

Figure 2:
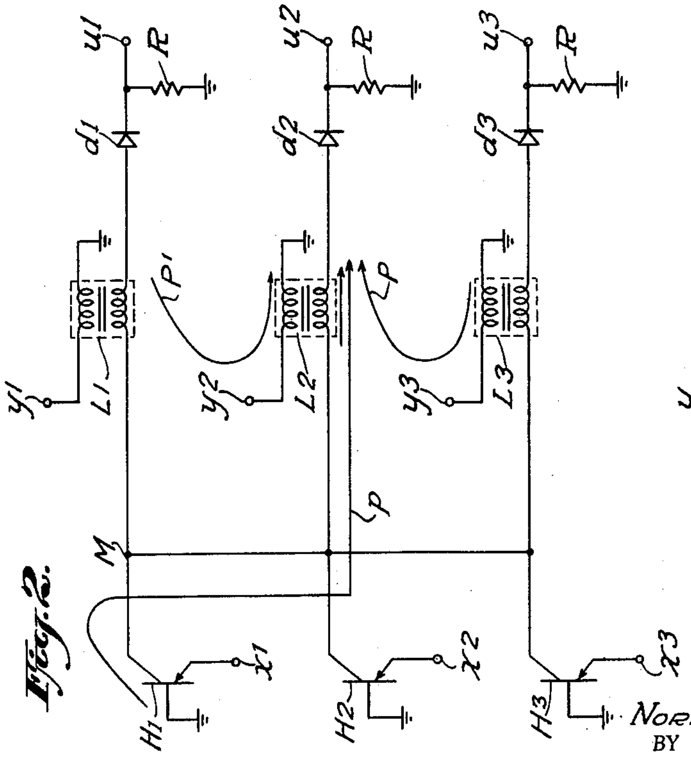
FIG. 2 shows a logical circuit of an example constructed on the principle of FIG. 1.

Consequently, if the inputs are applied to $x$ and $y$ simultaneously (both input pulses should overlap at least part of the time), the current flows in the arrow direction and a positive output appears at $u$. But, if an input signal is applied only to $x$ or $y$, an output signal does not appear at $u$, because the collector current will not flow when there is only emitter current or collector voltage. Therefore, the logical function of this current is:

$$U=X.Y \quad (1)$$

which is a logical product or AND circuit. FIG. 2 shows a second embodiment of the circuit following the invention, which is based on above principle.

If the input is applied to one of the $x$ terminals ($X_v$), for example $x_1$, the junction point M gets then into a conductive state to the earth through the transistor $H_1$, into which the emitter current flows. When the input is applied also to $y_2$, the voltage in the arrow direction is induced within the secondary winding of $L_2$.

Thus, if the input power for $y_2$ is strong enough, the collector current $\alpha ie$ ($\alpha$ is the amplification factor) flows along the path $p$ and it produces output at $u_2$.

In order to prevent the current from flowing into the paths $p'$ and $p''$ when the input is not applied to any of the terminals $x$, but to $y_2$ only, diodes $d_1$ and $d_3$ are inserted. Also diode $d_3$ serves for the same purpose for the output $u_2$. Thus, there is no output at any of the output terminals when the inputs are not applied to any of the $y_1$, $y_2$, $y_3$ even when an input signal is applied to an $x$ terminal.

The logical function of this circuit is:

$$U_v=(X_1+X_2+X_3)Y_v \qquad (2)$$

which is a logical sum or OR circuit.

If the inputs for $X_1=Y_2=1$ are applied to it, the current flows into the path $p$ in accordance with said principle. If the forward resistance of $d$ be smaller than R and if sufficient current $ie$ flows into the emitter of the transistor $H_1$, the power given to $y$ will appear at the load resistance R without any large attenuation. On the other hand, if a sufficient input is applied to $y$, the collector current $\alpha ie$ will flow into the path $p$ almost free from attenuation.

In consequence, this circuit has, theoretically, a high efficiency. Moreover, if the ordinary impedance for $y$ and the load resistance R are in proper balance and if a sufficient amount of emitter current is provided, a more effective circuit for input $y$ is obtained. The input impedance to this circuit at $y$ increases when input signals are not applied to any input terminals $x_v$, because the collector current can not pass into the secondary winding of L. Therefore, if other circuits similar to this circuit are driven in parallel from a common input terminal $y_v$, and if the output signals do not appear at two terminals $u_v$ at the same instant, it will be sufficient for $y$ to supply a small input power, even if a number of elements are connected with $y_v$ and are driven thereby.

When the synchronizing and reshaping inputs are connected to drive $y_v$ and there is a minute difference regarding the time and power level, the output that appears at $u$ will be offset, and thus, the function of $y$ also can be replaced by $x_v$, and the input for $x$ can be employed as a synchronizing and reshaping factor. In an example of this arrangement, the transistors are used with base ground circuits, but an almost same result can be achieved by using them, for example, with emitter ground circuits.

Figure 3:
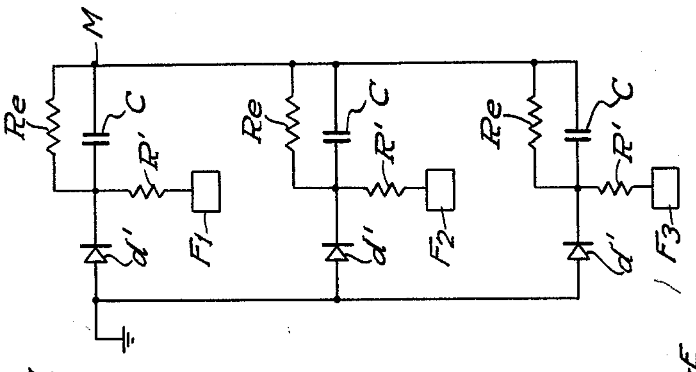
FIG. 3 shows a circuit of the left half of that of FIG. 2.

In FIG. 3 another embodiment of a circuit and having gate elements is illustrated. In the circuit of FIG. 3, diodes are employed in place of the transistors in FIG. 2. Here the diodes $d'$ are used as gate elements, and C designates a condenser, R$e$, a leak resistor, and R', a coupling resistor. A positive or negative bias voltage corresponding to the binary values of the outputs of flip-flop circuits $F_1$, $F_2$ and $F_3$ are applied to diodes $d'$ which perform a gate function.

Figure 4:
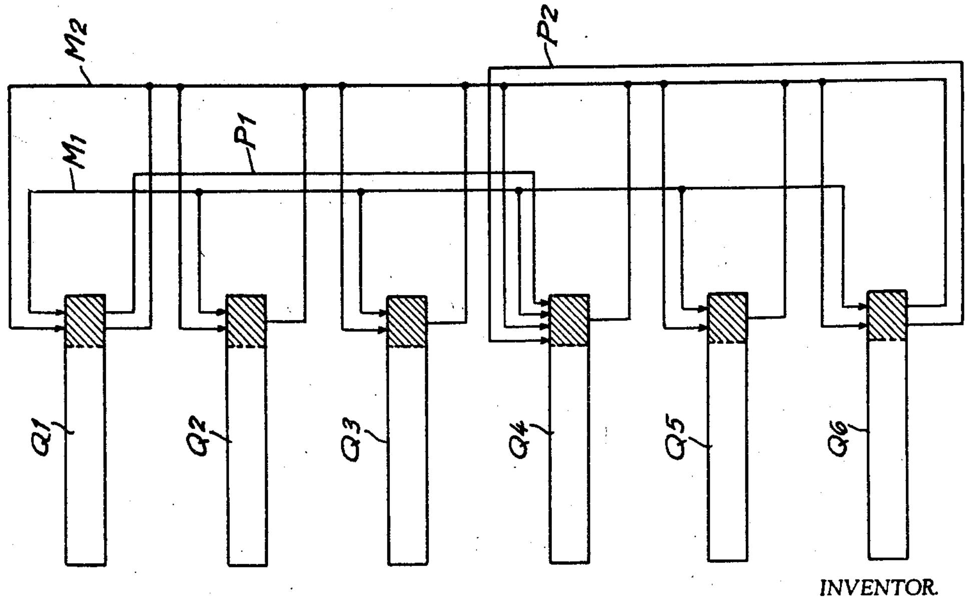
FIG. 4 shows selective transmission lines which connect the resistors and the arithmetic circuit to each other.

FIG. 4 shows an example of a circuit configuration in which those logical circuits are employed as selective transmission lines connecting the resistors and arithmetic circuit in an arithmetic unit. $Q_1$, $Q_2$, $Q_3$ . . . are the resistors or arithmetic circuit. Each one of them consists of a number of circuits, one for each bit. The small cells or shaded portion in each resistor are the circuits to work for the least significant bit or LSB. $M_1$ and $M_2$ are the distributors for the least significant bits. Taking $Q_1$ and $Q_6$ for resistors and $Q_4$ for an adder, and when it is desired to transmit all information in two resistors $Q_1$ and $Q_6$ to the adder $Q_4$ simultaneously, the information of each bit in the small cell of resistor reaches the corresponding small cell of the adder. For simplicity sake, only LSB will be taken up in this case. The information for LSB in $Q_1$ will be transmitted through the path $P_1$ to the small cell for the LSB in the adder, and the information for LSB in $Q_6$ will go through the path $P_2$ likewise. $P_1$ and $P_2$ are shown by dotted lines in FIG. 4. $M_1$ and $M_2$ correspond to the M in the FIG. 3 and the selective transmission lines to and from the distributors are composed of the left and right part of the circuit illustrated in FIG. 2.

Since all information of a number, which consists of $n$ bits and are treated as one word, have to be transmitted at one time in the arithmetic unit of a parallel computer, the high efficiency selective transmission circuits are to include pulse-transformers with one primary winding and some portions of the secondary winding. The transformers perform the same function as L in FIG. 2.

Figure 5:
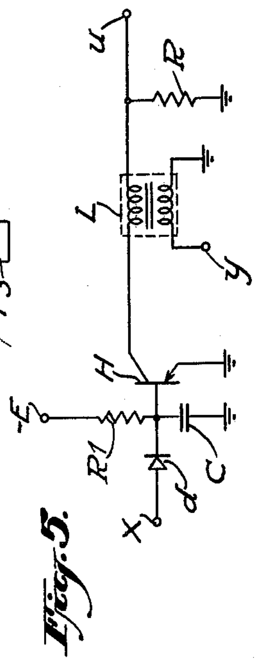
FIG. 5 shows another basic circuit after the invention.

Another basic circuit according to the invention is shown in FIG. 5, wherein $-E$ designates a terminal connected to a negative direct voltage source, H designates a transistor, L, a pulse-transformer, R, a load resistor, R1, a resistor, C, a condenser, $d$, a diode, $x$ and $y$, input terminals, and $u$, an output terminal.

The base direct current flows always into H and H is in the state in which the collector current can flow with negative collector voltage. In consequence, if an input signal is applied to $y$, and a voltage in the arrow direction is induced, the collector current flows only for the time of the pulse and the output will be obtained at terminal $u$. But, if a positive input is put to $x$, the base voltage of H will be kept at a positive potential for a short time by means of the storage function of condenser C. Therefore, even if the input is applied to $y$, when the base voltage is kept positive no output signal appears because H is in a non-conductive state. This base positive voltage discharges at the time constant to be determined by condenser C and resistor R1, and the base direct current flows in the transistor H again after C discharges. If such time constant is not required, condenser C can be omitted.

The logical function of this circuit is:

$$U=\overline{X}.Y. \qquad (3)$$

which is a logical denial circuit.

Where Y represents the constant input value, it is:

$$U=\overline{X} \qquad (4)$$

If a sufficient base current is passed into transistor H, when the input is not applied to $x$, and the aforementioned balance between the driving impedance of $y$ and the load resistance is made, the high efficiency denial circuit can be constructed in conformity with the principles explained in connection with FIG. 2.

Figure 6:
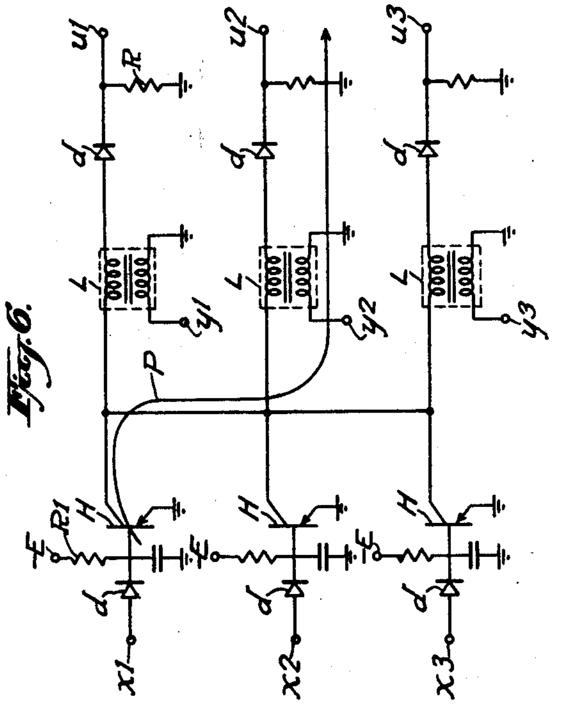
FIG. 6 shows a logical circuit of an example constructed in accordance with the principle shown in FIG. 5.

Another embodiment of a logical circuit comprising the basic circuit of FIG. 5 is shown in FIG. 6. If in FIG. 6 the logical input signals correspond to $X_2=X_3=Y_2=1$, making all others 0, the current flows along the path $p$ and the output is obtained at $u_2$ in accordance with the aforementioned principle. Thus the logical function of this circuit is:

$$Uu=(\overline{X_1+X_2+X_3})Yu \qquad (5)$$

where $u=1, 2, 3$.

Figure 7:
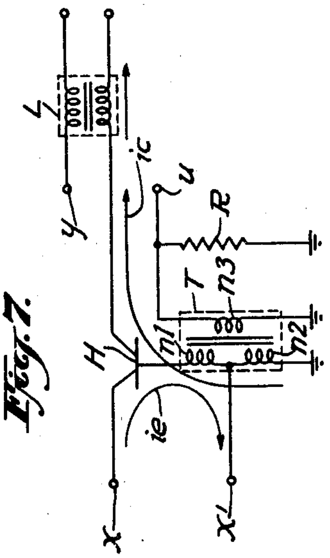
FIG. 7 shows still another example of basic circuit with the same function as aforementioned circuits according to the invention.

Another basic circuit according to the invention is shown in FIG. 7. $x$, $x'$ designate a pair of the input terminals corresponding to the logical value of X, T, an output transformer, $n_1$ and $n_2$, two primary windings and $n_3$, the secondary winding of T. If the emitter circuit current $ie$ from $x$, $x'$ flows into transistor H, an output will be obtained at $u$ through T. When an input signal is not applied to $y$, the collector current does not flow.

Then, if the input signal is put to $x$, $x'$ and $y$, the currents $ie$ and $ic$ flow simultaneously and these two currents will counteract at the base region, and no output will be obtained. Generally, since $ic=\alpha ie$ and $\alpha<1$, the above set-off will not be perfect. For the purpose of removing this disadvantage, the number of windings of T through which $ie$ and $ic$ flow are fixed by $n_1$ and $(n_1+n_2)$ respectively as it is shown in FIG. 7. When the input signal is applied to $y$ only, currents $ie$ and $ic$ will not be induced and therefore do not flow. The logical function of the circuit of FIG. 7 is:

$$U = X.\bar{Y}. \qquad (6)$$

If X is a constant input, then $$U = \bar{Y} \qquad (7)$$

Figure 8:
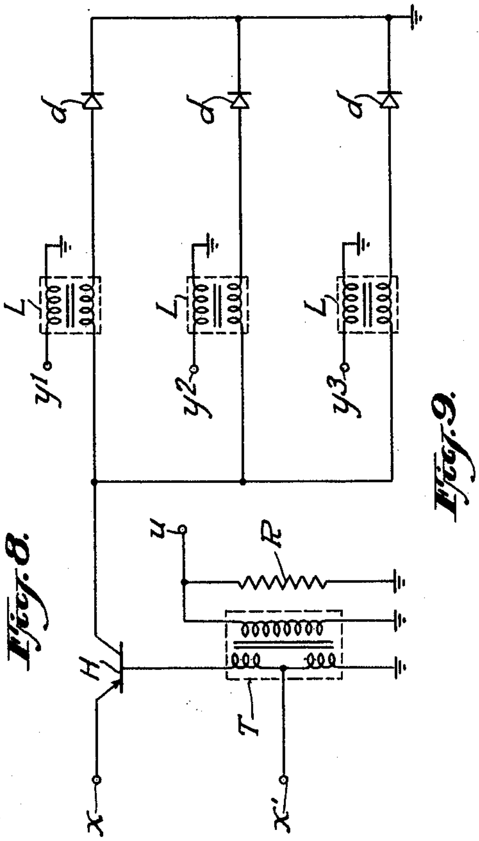
FIG. 8 shows the logical circuit of an embodiment constructed in conformity with the principle of FIG. 7.

An example of a logical circuit based on the basic circuit of FIG. 7 is shown in FIG. 8. The collector of the transistor H is branched to three output terminals. The collector voltage is then given to all branches by means of the input for $y_\nu$ that corresponds to the logical values of $Y_1$, $Y_2$, $Y_3$ respectively.

The logical function of this circuit is as follows:

$$U = X(\bar{Y_1} + \bar{Y_2} + \bar{Y_3}) \qquad (8)$$

Diodes $d$ are arranged in the branches to prevent the flowing of the inverse current.

Figure 9:
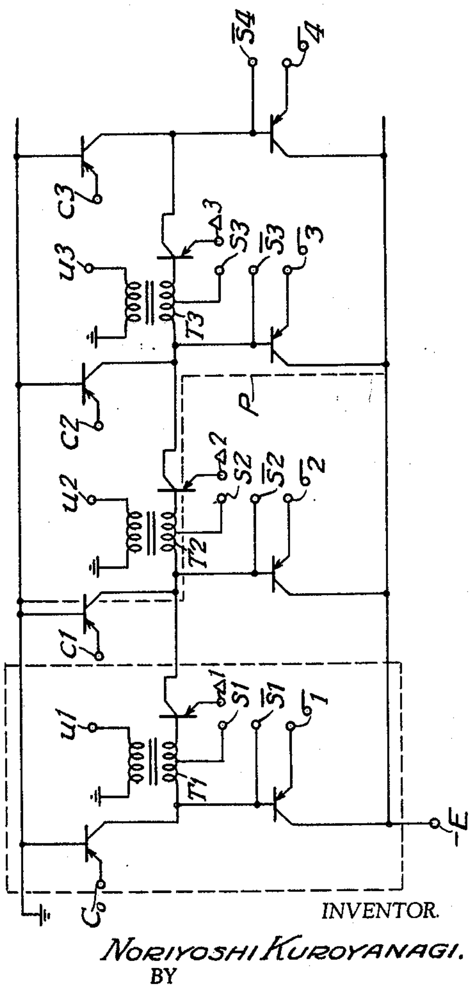
FIG. 9 is another example of the circuit to which the principle of FIG. 7 is applied.

An embodiment of the logical circuit to which the basic circuit of FIG. 7 is applied, is shown in FIG. 9. This circuit (carry propagating circuit) detects the extent of the carrying action in the case of addition and comprises the series and parallel connections of the transistors which are used as gate elements. In this circuit $T_1$, $T_2$ and $T_3$ are the output transformers corresponding to T in FIG. 7.

In FIG. 9 the part enclosed with dotted line is a unit of the circuit for one bit. The carry propagating circuit for a number of bits comprises the cascade connection of this circuit. The input for $C_\nu$ and $S_\nu$ and $\bar{S}_\nu$ are applied to the terminals $C_\nu(S_\nu.\sigma_\nu)$, and $(\bar{S}_\nu.\bar{\sigma}_\nu)$ respectively, and the corresponding transistors are turned into a conductive state or held in a non-conductive state with their input pulse values.

The logical function of the output obtained at $u_\nu$ is expressed with a logical value $U_\nu$ as the following:

$$U_1 = C_0$$
$$U_2 = U_1 S_1 = C_1$$
$$U_n = U_{n-1} + S_{n-1} + C_{n-1}$$
$$U_{n+1} = U_n . S_n + C_n$$
$$U_\nu = S\nu \oplus \bar{V}\nu$$

In the following the function of this circuit will be explained in more detail:

If the inputs are $C_0 = C_1 = C_2 = C_3 = 0$, $S_1 = S_3 = S_4 = 0$ and $S_2 = 1$ only, an output will be obtained at $u_2$. But if one input $C_2 = 1$ only is changed, the current will flow into the path $p$ shown by the dotted line, and the magnetic flux in $T_2$ will counteract and an output will not be obtained at $u_2$.

Figure 10:
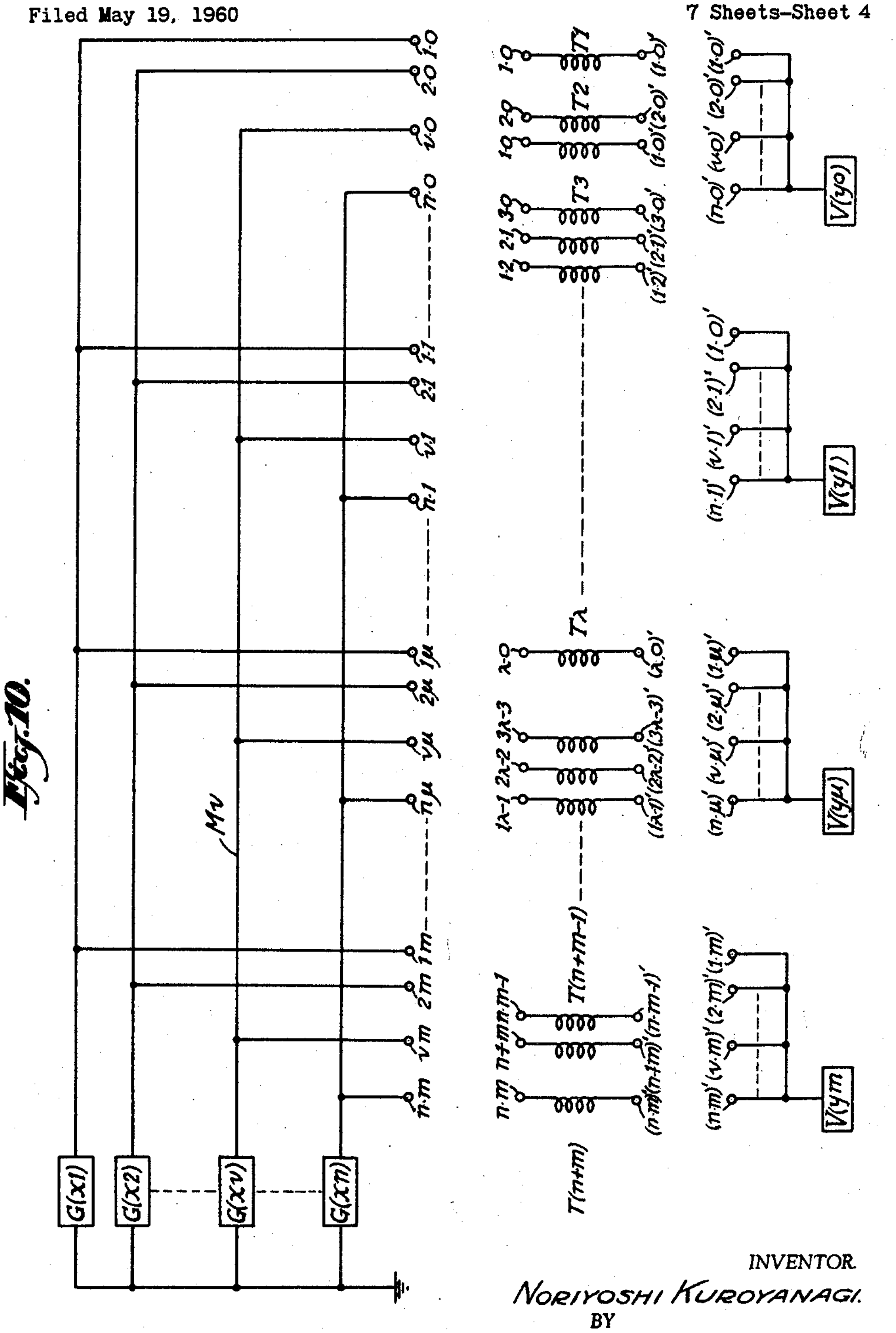
FIG. 10 shows a block diagram of a circuit which is an example of the invention.

The block diagram of an example in accordance with the invention is illustrated in FIG. 10. This circuit can shift the binary number of $n$ bits denoted by $$X = \sum_{\nu=1}^{n}$$

$X_\nu 2_{\nu-1}$ as many as from 0 to $m$ bits. $G(X_\nu)$ is the gate element corresponding to each bit X. Here G represents the gate element and means 1, 2, 3 . . . $n$. $M_\nu$ is the distributor controlled by $G(X_\nu)$. $V(y.\mu)$ where $\mu$ means 0, 1, 2 . . . $m$ is the voltage feeder which corresponds to $\mu$ bits for the shifting of X. $T_\lambda$ is the $\lambda$th output transformer, $\lambda$ being $\nu+\mu$. The both ends of the primary winding of the output transformer inserted in the branch line $B(\nu.\mu)$ are coupled to the voltage feeder $V(y.\mu)$ coming from the distributor $M\nu$ are indicated with $\nu.\mu$ and $(\nu.\mu)'$. The upper end $\nu.\mu$ of the primary winding is to be coupled to the lower end $\nu\mu$ of $B(\nu.\mu)$ and the lower end $(\nu.\mu)'$ of the primary winding to the upper end $(\nu.\mu)'$ of $B(\nu.\mu)$ in the FIG. 10.

Even when $V(y.\mu)$ is driven and the negative voltage is supplied to each branch line which connects $V(y.\mu)$, the current does not flow into any of the branch lines, if all the gates are kept in a non-conductive state. But, if $G(X_\nu)$ is driven by the input and changed to the conductive state, $M_\nu$ will conduct to the earth line and the current will flow to the branch line $B(\nu.\mu)$ going to $V(y.\mu)$ from $M_\nu$. Thus, the output is obtained through the output transformer $T(\nu+\mu)$ situated on $B(\nu.\mu)$. And if all gates are driven, the output will be obtained through each respective output transformer $T(2+\mu)$ . . . $T(n+\mu)$. In any case, the current does not flow through more than two primary windings of the same transformer. Since there exist not more than two bits of numbers which correspond to the shifting bit at the same time, one of $V(y.\mu)$ is driven only at a certain instant. Consequently, since the presence or absence of the input which drives the $\lambda$th gate decides the presence or absence of $(\nu+\mu)$th output, when $V(y.\mu)$ is driven, the input information train of one sequence $(X_1, X_2, \ldots X_n)$ appears at the output terminals shifted by $\mu$ bits $(U_{1+\mu}, U_{2+\mu}, U_{n+\mu})$.

Figure 11:
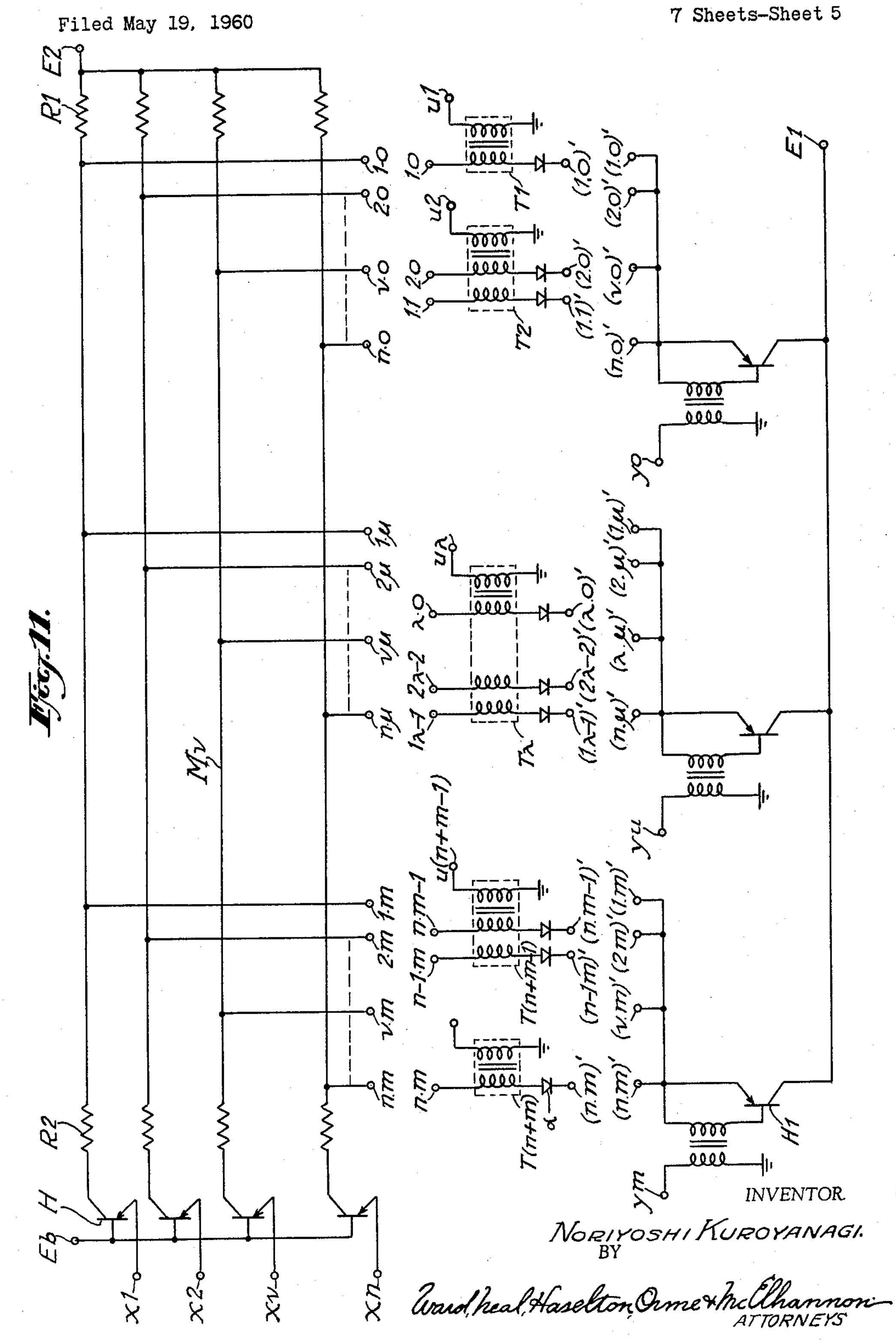
FIG. 11 shows the wiring of the circuits used in the example in FIG. 10.

Still another example of a shifting circuit composed of the circuit in FIG. 10 is shown in FIG. 11, where H is the gate element $G(X_\nu)$, $R_1$ and $R_2$ are resistances, $Eb$ is the positive direct bias voltage.

Now, when the inputs are given to $x_1$ and $y_\mu$ at the same time, the emitter current flows into the uppermost transistor H and the base current flows into the $\mu$th transistor H' and $M_1$ will tend to earth potential, the terminals $(\nu\mu)'$, $(\nu\mu)'$, $(2\mu)'$, $(1\mu)'$ will tend to $-E$. Thus the branch line which connects $M_1$ and one of those terminals is the only $B(1\mu)$ and it goes into the pulse transformer $T(1+\mu)$ through which the output is obtained at the output terminal $u(1+\mu)$. Since this terminal acts likewise for the inputs to the other gates $G(X_\nu)$, the output appears generally at $u(\nu+\mu)$.

In this way, the logical input will be shifted by $\mu$ bits simultaneously. The diodes are inserted for the purpose of preventing the flow of the inverse currents in the branch lines. $R_1$'s are high resistances. They keep the distributors in a deep negative voltage by means of $-E_2$ and the circuit of $R_1$ and $-E_2$ keep the minute leakage current away which flows into the branch lines to the non-driven voltage feeder. Furthermore, $M_\nu$ which is coupled to the gate in a conductive state approaches the earth potential and helps the flow of the minute leakage current into the branch lines which tend to flow in the non-driven voltage feeder.

Figure 12:
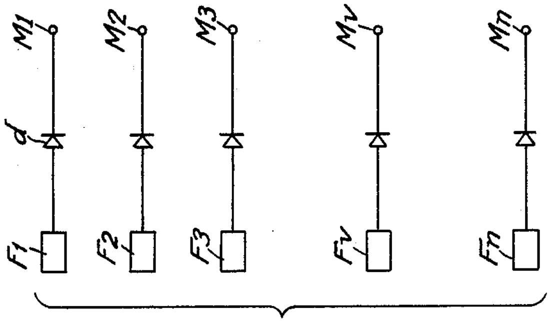
FIG. 12 shows another circuit used as gate in FIG. 11.

The undesirable effects are removed through the insertion of $R_2$, a low resistance between gates and distributors, because $M_\nu$, in a conductive state too, is kept in a little lower potential than the earth. FIG. 12 illustrates a circuit corresponding to the left part of the circuit in FIG. 11. In this example, flip-flops $F_{\nu'}$ are used as gate elements $G(x_\nu)$ of FIG. 10. The output terminal of $F_{\nu'}$ becomes either potential 0 or $-e$ with the input logical value 1 or 0 or X.

If $e \geqq E_1$, then $M_\nu$ becomes conductive for 0 and non-conductive for $-e$ by the action of diode $d$.

A flip-flop circuit can be also employed as $V(y.\mu)$ in FIG. 10. In this case, the output terminal of the flip-flop becomes either potential $-e$ or 0 with the input logical value 1 or 0 for $Y_\mu$.

Furthermore, H can be used also as an emitter grounded connection and H' as a base grounded connection.

Figure 13:
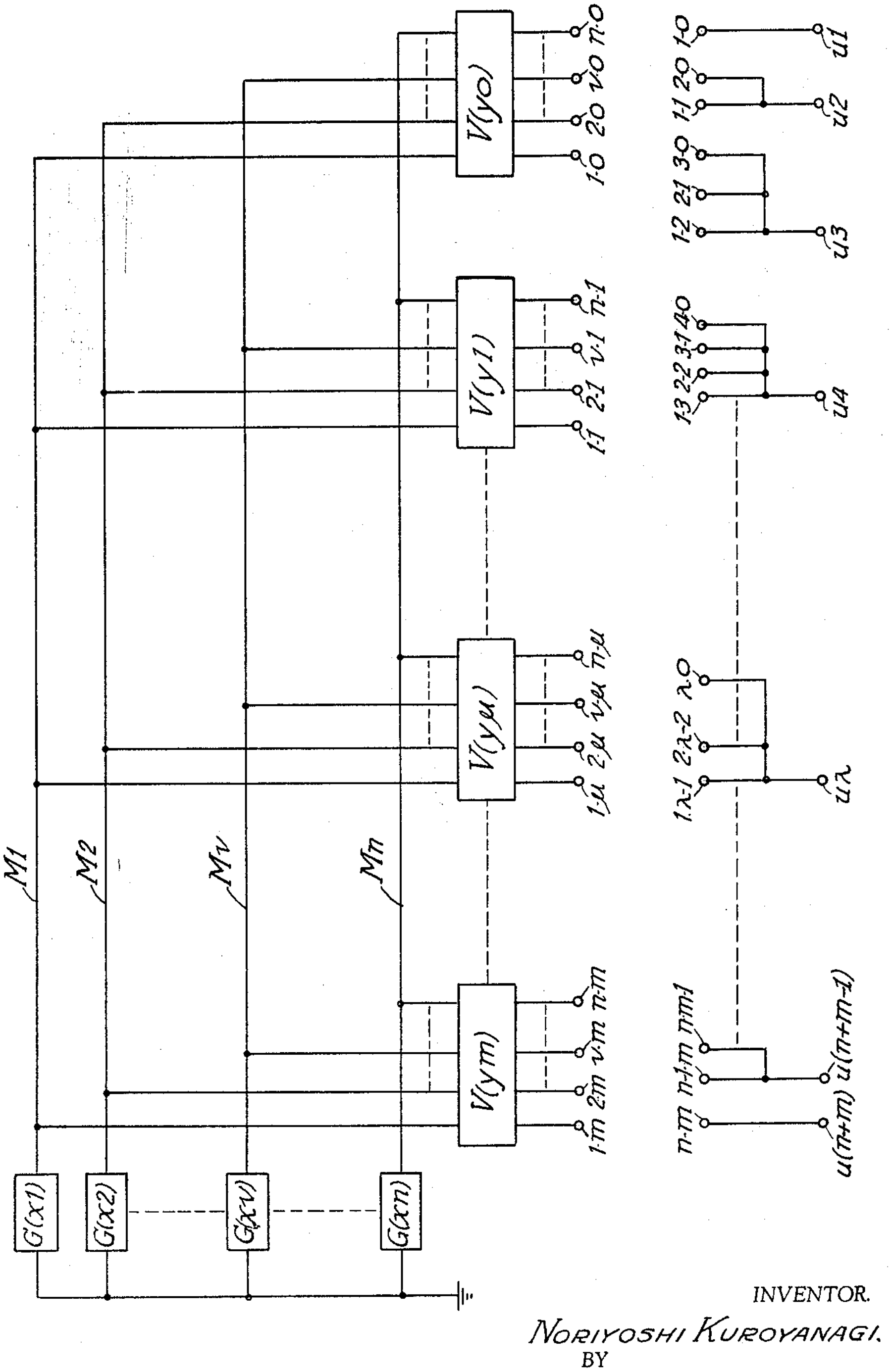
FIG. 13 shows a block diagram of a variation of the example illustrated in FIG. 10.

Another example of the block diagram according to the invention is shown in FIG. 13. This circuit has the same function as that of FIG. 10. But the location of the voltage feeder in this circuit is different from that of FIG. 10, and the pulse transformers as the output elements are not necessary except as the voltage feeder $V(y.\mu)$.

The lower end $\nu\mu$ of $V(y.\mu)$ and the upper end $\nu\mu$ of the output terminal $u_\lambda(\lambda = \nu+\mu)$ have to be coupled together.

Now, if the input for $X_\nu = 1$ and $Y_\mu = 1$ are applied, as $M_\nu$ connected to $G(X_\nu)$, tends to the conductive state and the voltage is induced between both ends of $V(y.\mu)$, the current flows into the branch line that connects $M_\nu$ and $V(y.\mu)$ and the output is obtained at the output terminal $u_\lambda(\lambda = \nu+\mu)$. In other words, the relative positive positions of $V(y.\mu)$ and the load resistances are reversed in the circuits of FIGS. 10 and 13.

Figure 14:
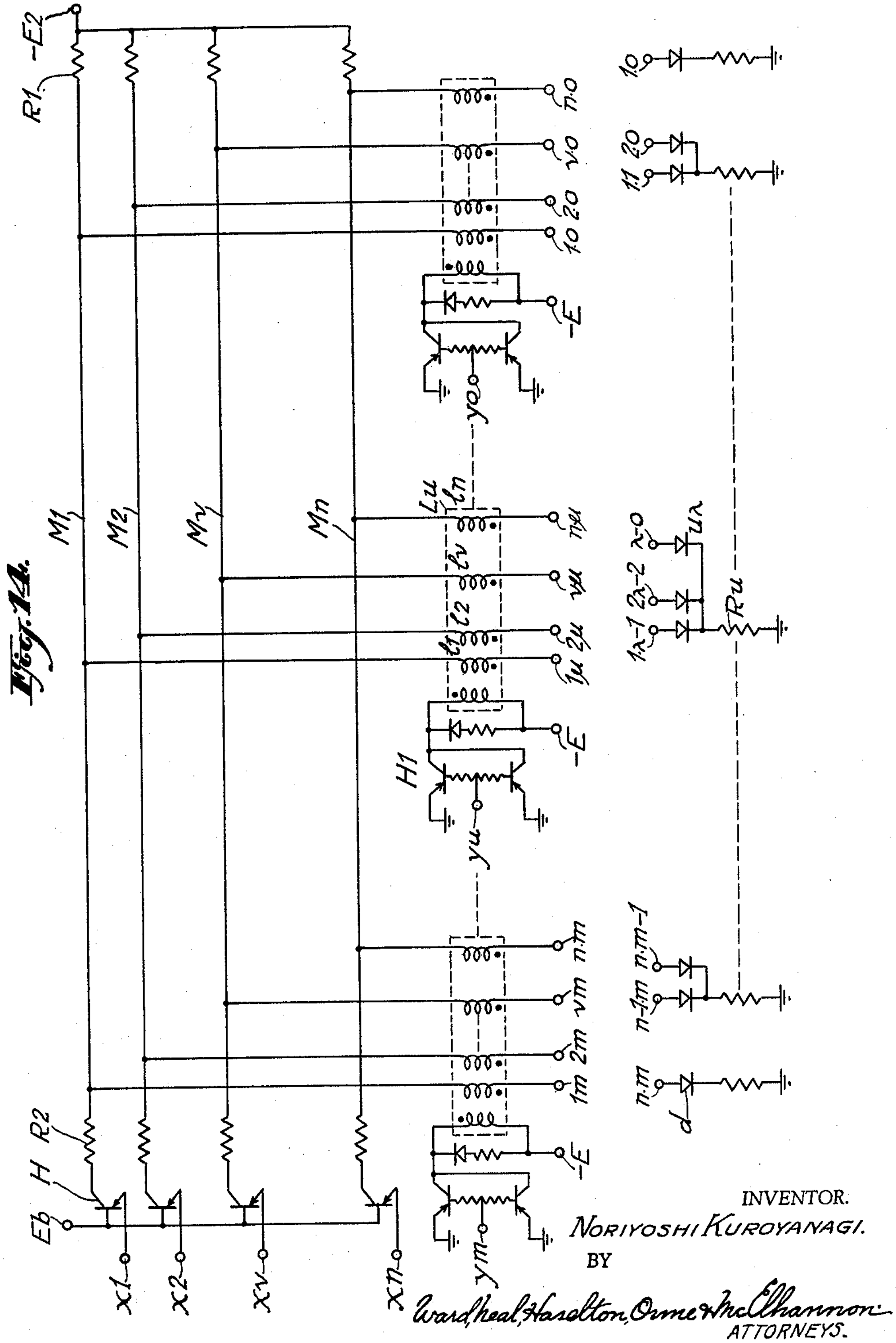
FIG. 14 shows a connection of the circuits employed in the example of FIG. 13.

A further example of the shifting circuit which is arranged after the block diagram in FIG. 13 is shown in FIG. 14, wherein $L_\mu$ is a pulse transformer and is used as voltage feeder $V(y.\mu)$. Since H' drives the primary winding of $L_\mu$ by the input to $y_\mu$, the voltage is induced in a number of parts of the secondary windings which connect all distributors $M_\nu$. Diode d's check the inverse current flow into the branch lines and perform the OR function by which each branch line corresponding to the same output terminal, is connected.

These shifting circuits can be applied not only to the binary numbers, but also to decimal numbers or others which are codes by $n$ bits, by the same principle.

For example, if a decimal number is represented by the excess of three codes, the value of each decimal digit $X_\delta$ is expressed by bits $X_{\delta1}$, $X_{\delta2}$, $X_{\delta3}$ and $X_{\delta4}$. If the circuit of FIG. 14 is considered, the distributors for $X_\delta$, $X_{\delta+1}$ are arranged by $M_{\delta1}$, $M_{\delta2}$, $M_{\delta3}$, $M_{\delta4}$, $M_{\delta+1}$, $M_{\delta+2}$ and four distributors have to be arranged for each decimal digit which branch to the four parts of the secondary windings of the same transformer $L_\mu$, and these four branches are led to the respective output terminals $u_{\lambda1}$, $u_{\lambda2}$, $u_{\lambda3}$ and $u_{\lambda4}$ . . . $\lambda=\nu+\mu$. Thus, the shifting circuit for the decimal number will be formed.

These two shifting-circuits can be applied as circuits to get the AND outputs for each two bits of the two binary numbers. In this case, taking the circuit of FIG. 14 for example, all diodes connected to the output terminals are separated and led to the different output terminals respectively. Thus, the $n_2$ pieces of AND outputs are obtained from the two numbers with $n$ bits.

From the explanations above described, the features of the invention are summarized as follows:

(1) The logical circuit after the invention can be constructed with stable and cheap elements such as diodes, transistors and pulse transformers, (2) Complicated logical functions can be solved by smaller elements in comparison to other types of circuit and it enables a manufacturing of transformers with a number of windings, (3) The logical circuits after the invention have advantages in power efficiency, and less time is required than for regenerative amplification in performing complicated logical functions and in consequence, a high speed operation is possible with this type of circuit, (4) These circuits are applicable also to the high frequency region, (5) Regarding the principal applications and engineering of this type of circuits, it can be said:

a. in arithmetic equipment, the selective transmission circuits that transmit the information of one word, are easy to construct.
b. logical denial circuits with high efficiency, necessary for various kinds of logical operation can be constructed as applications of the idea of this invention.
c. using the shifting-circuit afore-mentioned, with the addition and subtraction by use of a floating point, multiplication and division are carried out with a remarkable speed.

Since many changes could be made in the above construction and many different embodiments of this invention could be made without departing from the scope thereof, it is intended that all matters contained in the above descripiton or shown in the accompanying drawings shall be interpreted as illustrative and not in a limiting sense.

What is claimed is:

1. A logical circuit comprising a gate control device having first, second and third electrodes, a transformer having primary and secondary windings, means connecting said secondary winding between said third electrode and another of said electrodes, means for supplying a first varying amplitude control signal to said primary winding and thereby providing a voltage at the output of said second winding, and voltage pulse supply means connected between said first and second electrodes for supplying a second control signal voltage pulse to said first and second electrodes, said voltage pulse being of a polarity and amplitude which will cause current to flow through said secondary winding only when said second control signal voltage pulse is also supplied to said first and second electrodes and the bias on said third electrode otherwise being such that current flow through said secondary winding is substantially zero in the absence of said first control signal and in the presence and absence of said second control signal voltage pulse.

2. A logical circuit according to claim 1 wherein said second control signal is a direct current biasing voltage and further comprises a pulse signal source connected between said first and second electrodes and oppositely polarized with respect to said biasing voltage.

3. A logical circuit comprising a gate control device having first, second and third electrodes, a first transformer having primary and secondary windings, a second transformer having a pair of primary windings and a secondary winding, a load circuit connected to said last-mentioned secondary winding, means connecting said secondary winding of said first transformer and said pair of primary windings in series with each other and between said third and second electrodes, means for supplying a varying amplitude first control signal to said primary winding of said first transformer and to thereby provide a voltage at the output of said secondary winding of said first transformer, and means connected between said first electrode and the junction point between said pair of primary windings for supplying a second varying amplitude control signal to said first and second electrodes, the ratio of the turns of said pair of primary windings being such that the current in said load circuit is substantially zero during the simultaneous application of both said control signals to said device.

4. A logical circuit according to claim 3 wherein said device is a transistor and said first, second and third electrodes are respectively emitter, base and collector electrodes.

5. A logical circuit comprising a plurality of gate control devices, each of said devices having first, second and third electrodes, means interconnecting the third electrode of each device with a common point, a plurality of load circuits equal in number to the number of said devices, a plurality of transformers and uni-directional elements equal in number to the number of said devices, each of said transformers having a primary and a secondary winding, means connecting the secondary winding of each transformer and one of said elements in series with each other between said common point and one of said load circuits, means connected to the primary windings of said transformers for supplying first varying amplitude control signals thereto and thereby producing voltages at the outputs of the secondary windings, means connected to the first and second electrodes of said devices for supplying second varying amplitude control signals thereto, said voltages being of a polarity and amplitude which will cause current to flow in the load circuit connected to the secondary winding at which a voltage is produced only when said second control signals are also supplied to said first and second electrodes of at least one said device and the bias on said third electrodes otherwise being such that current flow through a load circuit connected with a secondary winding is substantially zero in the absence of first control signals at the primary winding associated with said last-mentioned secondary winding and in the presence and absence of said second control signals.

6. A logical circuit comprising a plurality of gate control devices, each of said devices having first, second and third electrodes, means interconnecting the third electrode of each device with a common point, a plurality of load circuits equal in number to the number of said devices, a plurality of transformers and uni-directional elements equal in number to the number of said devices, each of said transformers having a primary and a secondary winding, means connecting the secondary winding of each transformer and one of said elements in series with each other between said common point and one of said load circuits, means connected to the primary windings of said transformers for supplying first varying amplitude control signals thereto and thereby producing voltages at the outputs of the secondary windings, means for supplying a biasing voltage to each of said first and second electrodes, means connected to the first and second electrodes of said devices for supplying second varying amplitude control signals thereto, said voltages at the outputs of said secondary windings and said biasing voltage being of a polarity and amplitude which will cause current to flow in the load circuit connected to the secondary winding at which a voltage is produced only when said second control signals are absent at all said first and second electrodes and the bias on said electrodes otherwise being such that current flow through a load circuit connected with a secondary winding is substantially zero in the absence of first control signals at the primary winding associated with said last-mentioned secondary winding and in the presence and absence of said second control signals.

7. A logical circuit comprising a gate control device having first, second and third electrodes, a plurality of first transformers and uni-directional elements, each of said transformers having a primary and a secondary winding, means connecting the secondary winding of each transformer and one of said elements in series with each other between said third electrode and a common point, means connected to the primary windings of said transformers for supplying first varying amplitude control signals thereto and thereby producing voltages at the outputs of the secondary windings, a second transformer having a pair of primary windings connected in series between said second electrode and said common point and having a secondary winding, a load circuit connected to said secondary winding, means connected to said first electrode and the junction point of said primary windings for supplying second varying amplitude control signals thereto, said voltages being of a polarity and amplitude which will cause current to flow in the secondary winding at which a voltage is produced only when said second control signals are also supplied to said first and second electrodes and the bias on said electrodes otherwise being such that current flow through said primary windings is substantially zero in the absence of said second control signals, the ratio of the turns of said primary windings being such that the current in said load circuit is substantially zero when said first and second control signals are supplied simultaneously to a primary winding of a first transformer and to said first electrode.

References Cited by the Examiner

UNITED STATES PATENTS

| | | | |
|---|---|---|---|
| 2,275,027 | 3/42 | Bell | 328—210 |
| 2,322,754 | 6/43 | Undy | 328—210 |
| 2,750,509 | 6/56 | Enders | 307—88.5 |
| 2,882,482 | 4/59 | Simkins | 307—88.5 |
| 2,939,119 | 5/60 | Einsele | 307—88.5 |
| 2,964,647 | 12/60 | Rubinstein | 307—88.5 |
| 2,988,653 | 6/61 | Samusenko | 307—88.5 |
| 2,994,003 | 7/61 | Einsele et al. | 307—88.5 |
| 3,084,263 | 5/63 | Van De Weg et al. | 307—88.5 |

ARTHUR GAUSS, *Primary Examiner.*

GEORGE N. WESTBY, *Examiner.*